United States Patent
Baditoi et al.

(10) Patent No.: US 9,114,492 B2
(45) Date of Patent: Aug. 25, 2015

(54) COOLANT SUPPLY FOR A MACHINE TOOL

(71) Applicant: AHHNEU-ELLSWORTH LIMITED LIABILITY COMPANY, Algonac, MI (US)

(72) Inventors: Douglas J. Baditoi, Algonac, MI (US); Robert L. Lang, Flint, MI (US); Ellsworth S. Miller, Royal Oak, MI (US)

(73) Assignee: Ahhneu-Ellsworth Limited Liability, Algonac, MI (US)

( * ) Notice: Subject to any disclaimer, the term of this patent is extended or adjusted under 35 U.S.C. 154(b) by 395 days.

(21) Appl. No.: 13/646,679

(22) Filed: Oct. 6, 2012

(65) Prior Publication Data

US 2013/0089382 A1    Apr. 11, 2013

Related U.S. Application Data

(60) Provisional application No. 61/544,779, filed on Oct. 7, 2011.

(51) Int. Cl.
    *B23Q 11/10*    (2006.01)

(52) U.S. Cl.
    CPC ............ *B23Q 11/10* (2013.01); *B23Q 11/1076* (2013.01); *Y10T 408/44* (2015.01); *Y10T 408/46* (2015.01)

(58) Field of Classification Search
    CPC .. B23Q 11/1076; B23Q 11/005; B23Q 11/10; Y10T 408/44; Y10T 408/46; Y10T 408/458
    USPC ................................................ 408/56, 60, 61
    See application file for complete search history.

(56) References Cited

U.S. PATENT DOCUMENTS

| | | | | |
|---|---|---|---|---|
| 1,316,236 A | * | 9/1919 | Hoffman | 408/56 |
| 2,272,271 A | * | 2/1942 | Mallory | 408/1 R |
| 2,404,149 A | * | 7/1946 | Trinkle | 409/136 |
| 4,322,992 A | * | 4/1982 | Remillard et al. | 82/152 |
| 5,593,256 A | * | 1/1997 | Bielak et al. | 408/1 R |

FOREIGN PATENT DOCUMENTS

| | | | | |
|---|---|---|---|---|
| DE | 4401756 A1 | * | 7/1995 | |
| EP | 2745967 A1 | * | 6/2014 | |
| JP | 61236455 A | * | 10/1986 | |
| JP | 63089208 A | * | 4/1988 | |
| JP | 02106208 A | * | 4/1990 | |
| JP | 03208539 A | * | 9/1991 | |
| JP | 04283011 A | * | 10/1992 | |
| JP | 06179120 A | * | 6/1994 | |
| JP | 07328885 A | * | 12/1995 | |
| JP | 2004358651 A | * | 12/2004 | |
| JP | 2008307649 A | * | 12/2008 | |
| SU | 1342619 A | * | 10/1987 | |
| WO | WO 8908534 A1 | * | 9/1989 | |

\* cited by examiner

*Primary Examiner* — Daniel Howell
(74) *Attorney, Agent, or Firm* — Reising Ethington P.C.

(57) ABSTRACT

A fluid delivery system for use with a cutting tool used to machine an opening in a workpiece may include a delivery tube having an outlet to be aligned with a cutting tool and a fluid supply coupled to the delivery tube to provide fluid to the delivery tube under pressure. The delivery tube is aligned with the workpiece at a side of the opening opposite to the side through which the cutting tool is initially inserted and supplies fluid to the workpiece and cutting tool in a direction generally opposite to the direction that the cutting tool is inserted into the workpiece.

15 Claims, 4 Drawing Sheets

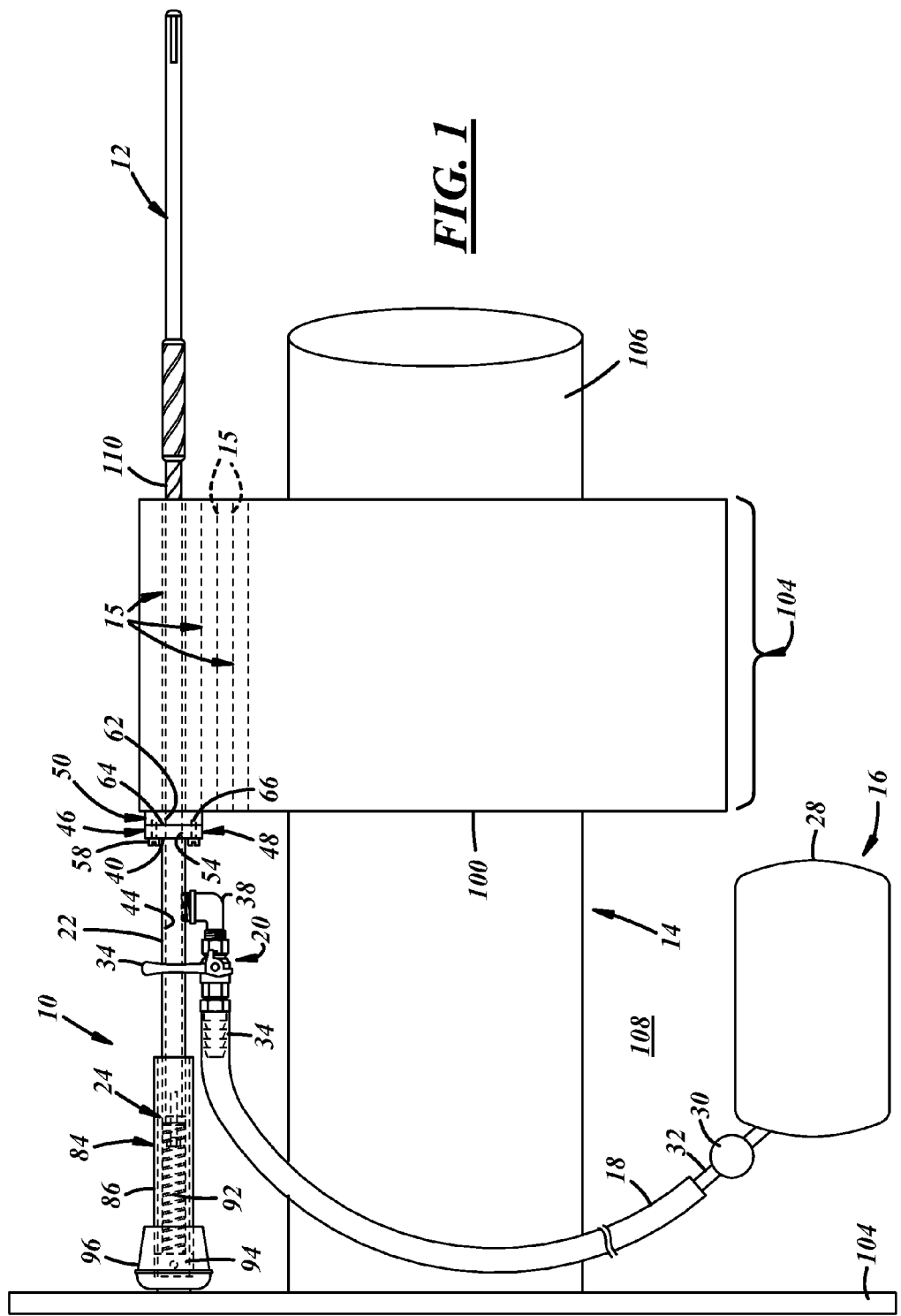

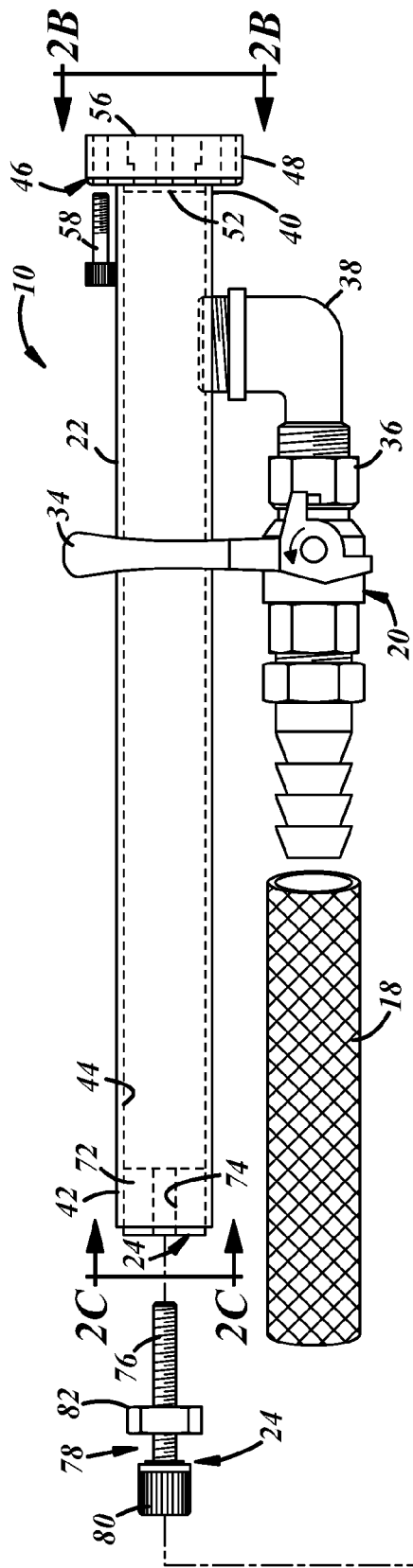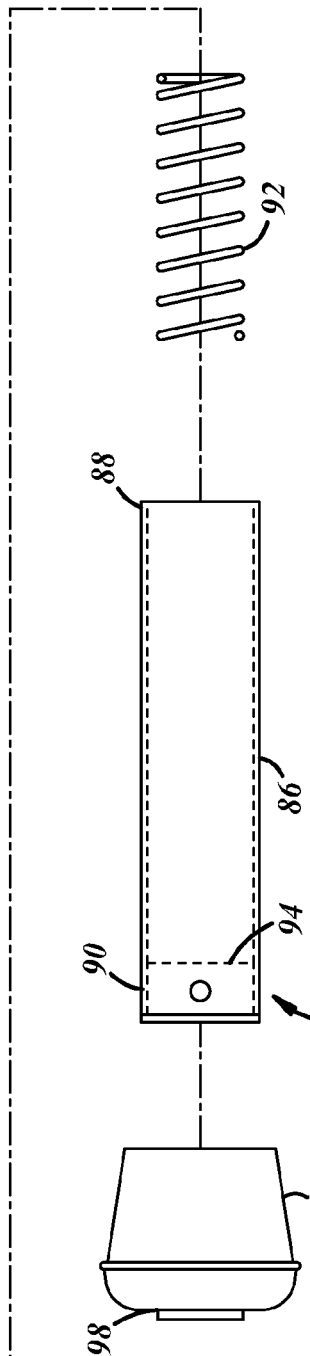

COOLANT SUPPLY FOR A MACHINE TOOL

REFERENCE TO CO-PENDING APPLICATION

This application claims the benefit of U.S. Provisional Application No. 61/544,779 filed Oct. 7, 2011, which is incorporated herein by reference in its entirety.

TECHNICAL FIELD

The present disclosure relates generally to machine tools and more particularly for a coolant supply system for a machine tool, such as a reamer.

BACKGROUND

Machine tools of many shapes, sizes and varieties are used to machine metal and other workpieces. Fluid is often provided to the machine tool and/or the workpiece surface being machined to cool one or both of the tool and workpiece and/or flush away debris and metal chips. In hole forming tools, like a drill or reamer, fluid has been provided through passages formed in the machine tool itself and generally in the direction that the tool is inserted into the hole and from the same side of the workpiece from which the tool is inserted.

SUMMARY

A fluid delivery system for use with a cutting tool used to machine an opening in a workpiece may include a delivery tube having an outlet to be aligned with a cutting tool and a fluid supply coupled to the delivery tube to provide fluid to the delivery tube under pressure. The delivery tube is aligned with the workpiece at a side of the opening opposite to the side through which the cutting tool is initially inserted and supplies fluid to the workpiece and cutting tool in a direction generally opposite to the direction that the cutting tool is inserted into the workpiece.

Another fluid delivery system for use with a cutting tool used to machine an opening in a workpiece may include a delivery tube having an outlet to be aligned with a cutting tool, an extender and a fluid supply. The extender is coupled to the delivery tube with an extender tube having a first end telescopically received over an end of the delivery tube, and a biasing member that yieldably biases the extender away from the delivery tube so that the distance between a second end of the extender and the outlet of the delivery tube can be adjusted by slidably displacing the extender tube along the delivery tube. The fluid supply is coupled to the delivery tube to provide fluid to the delivery tube under pressure. And the delivery tube is aligned with the workpiece at a side of the opening opposite to side through which the cutting tool is initially inserted and supplies fluid to the workpiece and cutting tool in a direction generally opposite to the direction that the cutting tool is inserted into the workpiece.

BRIEF DESCRIPTION OF THE DRAWINGS

The following detailed description of preferred embodiments and best mode will be set forth with reference to the accompanying drawings, in which:

FIG. 1 is a diagrammatic view of a fluid delivery system, machine tool and a workpiece being machined;

FIG. 2A is an exploded view of the fluid delivery system;

FIG. 2B is an end view of a flange fitting;

FIG. 2C is an end view of a delivery tube;

DETAILED DESCRIPTION OF PREFERRED EMBODIMENTS

Figure 3:
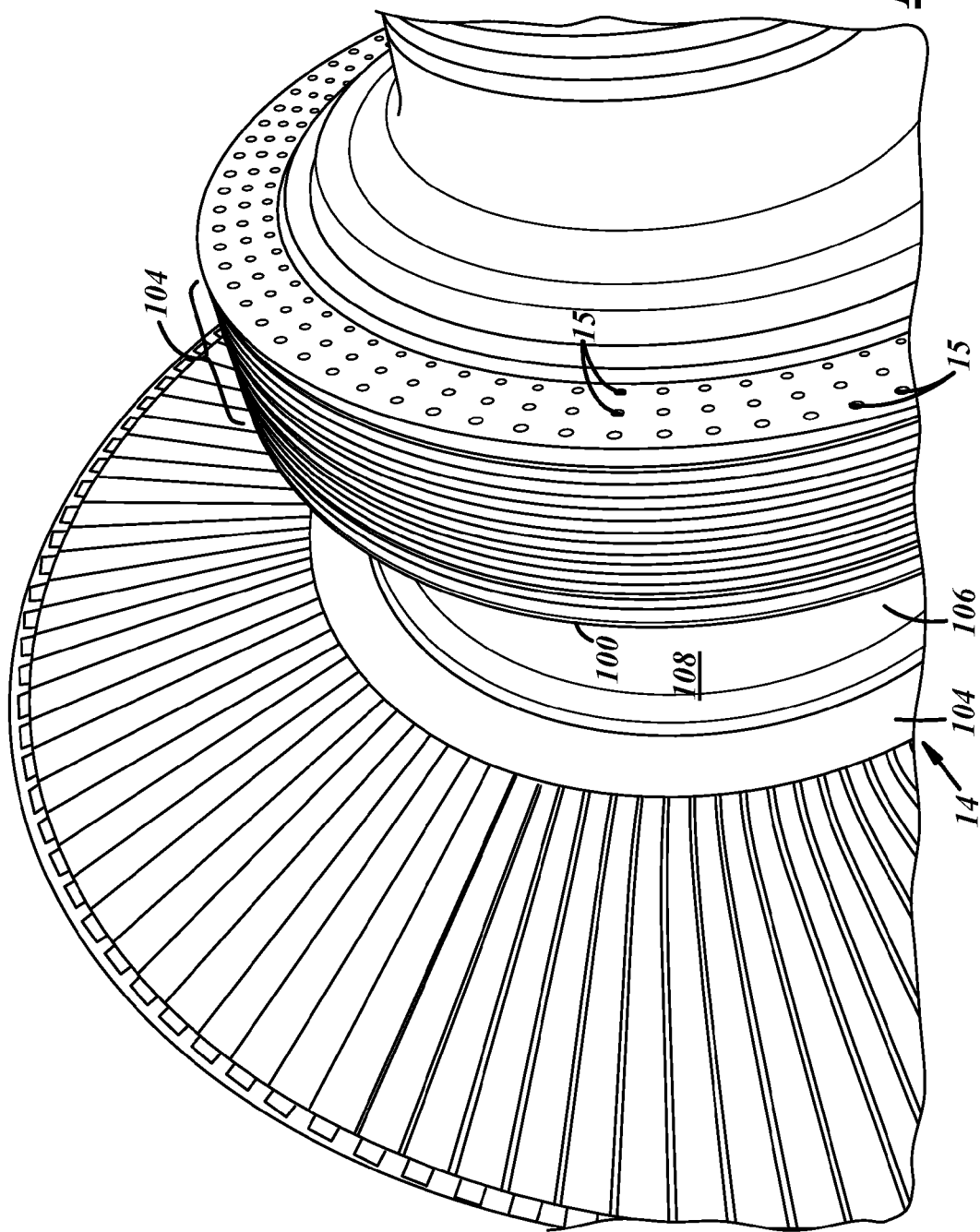
FIG. 3 is a fragmentary view of a portion of a steam turbine showing holes in the turbine that are to be machined, such as by a reamer.

Referring in more detail to the drawings, FIG. 1 illustrates a fluid delivery system 10 for use with a machine tool, such as a reamer 12. As shown in FIG. 1, a workpiece 14, which in this example is a steam turbine, is being worked on with the reamer 12 for reaming one or more holes 15 in the workpiece 14. Of course, the workpiece 14 may be something other than a turbine, and the machine tool may be something other than a reamer 12. The fluid delivery system 10 is provided to supply fluid to the reamer 12 and the workpiece 14. The fluid delivery system 10 may include a fluid supply 16, a supply tube 18, a shut-off valve 20, a delivery tube 22 and an adjustable stop 24. The delivery tube 22 may be aligned with the reamer 12 and a hole 15 in the workpiece 14 to be reamed, and fluid may be provided through the delivery tube 22 into the hole 15 and onto the reamer 12.

The fluid supply 16 may include any reservoir 28 of coolant/cutting fluid and a pump 30 to move the fluid from the reservoir 28 to the delivery tube 22 via the supply tube 18. The supply tube 18 may have an inlet end 32 through which fluid is received and an outlet end 34 through which fluid is directed to the delivery tube 22. In at least some implementations, the fluid may be pumped through the supply tube 18 at a flow rate of about 3 or more gallons per minute, although any suitable rate can be used.

In one implementation, the shut-off valve 20 may be located between the supply tube 18 and the delivery tube 22, although the shut-off valve 20 may be located on or carried by only the supply tube 18 or only the delivery tube 22. The shut-off valve 20 may be a ball valve having an actuating lever 34 that may be manually manipulated, or the shut-off valve could be automatically controlled, such as a solenoid valve actuated by a signal provided from an electronic controller. In the implementation shown, the shut-off valve 20 has an outlet 36 coupled to the delivery tube 22 by an elbow joint 38 (or any suitable joint including direct connection of the valve to the delivery tube without an intermediate connector or component) to enable fluid flow into the delivery tube 22 when the shut-off valve 20 is at least partially open. The shut-off valve 20 could have only open and closed positions, or it could be moved through one or more partially open positions to throttle or control the flow rate of fluid therethrough.

The delivery tube 22 may be a straight, rigid and hollow conduit with an outlet end 40 through which fluid is discharged, a second end 42 opposite to the outlet end 40 and a passage 44 through which fluid may flow. In one form, the delivery tube 22 is formed of stainless steel, although other materials could be used. At the outlet end 40, an interface 46 suitable for use with the workpiece 14 may be provided.

In one implementation, the interface 46 includes a flange fitting 48 coupled to the delivery tube 22 and a bushing 50 that may be coupled to the flange fitting 48. The flange fitting 48 may be brazed or otherwise connected and sealed to the delivery tube 22 (e.g. by mating threaded portions of the flange fitting 48 and the tube 22). The flange fitting 48 may include a mounting stub 52 (FIG. 2A) adapted to be at least partially received within the passage 44 of the delivery tube 22, a primary opening 54 aligned with the passage 44 of the delivery tube 22, and an outward face 56 that may have a larger diameter than the delivery tube and defines an annular mounting surface around the primary opening 54. To facilitate connecting the flange fitting 48 to the delivery tube 22, the mounting stub 52 may be received within the delivery tube 22. In at least some forms, the bushing 50 may be removably connected to the delivery tube 22 via the flange fitting 48 by screws 58 or other removable fasteners or connectors to permit different bushings to be used. This may facilitate repair or replacement of a bushing 50 and permit different bushings to be used with the same fluid delivery system 10. When screws 58 are used, they may mate with threaded secondary openings 60 in the flange fitting 48, or nuts and bolts may be used to couple together the flange fitting and bushing 50. The flange fitting 48 may be made of stainless steel or any other material suitable for use with the fluid being used and capable of coupling the bushing 50 to the delivery tube 22.

The bushing 50 may be annular and have a primary opening 62 (FIG. 1) aligned with the primary opening 54 of the flange fitting 48 and the passage 44 of the delivery tube 22 to permit fluid to flow through the primary opening of the bushing. The bushing 50 may also have a mounting face 64 adapted to be received against the outward face 56 of the flange fitting 48. The mounting faces 56, 64 may be complementarily shaped, and in the implementation shown, are flat, planar surfaces although they could be contoured (e.g. with ribs, keys and slots, etc), if desired. To facilitate mounting the bushing 50 to the flange fitting 48, the bushing 50 may include a plurality of secondary openings 66 through which screws 58 or bolts may be received. If desired, a gasket or other seal could be provided between the bushing and flange fitting to limit or prevent fluid leakage between them, although this may not be needed in at least certain applications. The bushing 50 may be carried instead by or adjacent to the workpiece, and the bushing may be carried directly by the delivery tube 22 without any flange fitting 48 between them.

The adjustable stop 24 may be carried by or adjacent to the second end 42 of the delivery tube 22. The adjustable stop 24 may include an insert 72 having an outer diameter adapted to be closely received within the inner diameter of the delivery tube 22 and a threaded opening 74 to rotatably receive and retain a threaded shank 76 of an adjustment member 78. The shank 76 may be axially longer than the insert 72 so that an end of the shank extends into the passage 44 of the delivery tube 22. The adjustment member 78 may be a cap screw having an enlarged head 80 extending from the shank 76 to facilitate turning the adjustment member 78 and advancing or retracting it relative to the insert 72 and delivery tube 22. A nut 82 may be provided to facilitate retaining a desired position of the adjustment member 78 relative to the insert 72, by tightening the nut 82 down against the insert 72 to prevent unintended movement of the adjustment member 78. A seal may be provided between the shank 76 and insert 72 to prevent fluid leakage out of the delivery tube 22 between the insert and screw, if desired, although a seal may not be needed in at least certain applications.

To permit adjustment of the length of the fluid delivery system 10 and to permit it to be releasably retained in position between two surfaces (e.g. a workpiece and an opposite structure or wall), an adjustable extender 84 may be coupled to the delivery tube 22. The extender 84 may include a tube 86 having a first end 88 telescopically received over the second end 42 of the delivery tube 22 and a second end 90 axially spaced from the second end of the delivery tube. The extender 84 may include a biasing member, such as a spring 92, that yieldably biases the second end 90 of the extender 84 away from the second end 42 of the delivery tube 22. At one end, the spring 92 may engage the delivery tube 22 and/or the insert 72, and at its other end the spring may engage a stop surface 94 that may be carried by the tube 86 or a surface against which the second end 90 of the tube 86 is placed. In one form, a cap 96 is provided on or over the second end 90 of the extender tube 86 and the spring 92 may engage an inside surface of the cap 96 if no other stop surface is provided. To frictionally engage an adjacent structure, the cap 96 may include a low slip outer surface 98 (e.g. the cap could be formed of a relatively soft and resilient material like rubber or plastic).

The distance between the second end 90 of the extender 84 and the outlet end 40 of the delivery tube 22 (and/or the bushing 50) which may define the total length of at least this portion of the fluid delivery system 10, can be adjusted by slidably displacing the extender tube 86 along the delivery tube 22 against the force of the spring 92. When the spring 92 is at least somewhat compressed, it provides a force tending to hold the second end 90 of the tube 86 (e.g. the cap 96) against an adjacent surface and the bushing 50 against the workpiece 14 to hold the delivery tube 22 and bushing 50 in place relative to a workpiece. In this way, the fluid delivery system 10 does not need to be otherwise held in place (e.g. either manually or with a fixture, clamp or other device), and its position can be readily adjusted or changed to a different location, as desired.

In use, the fluid delivery system 10 may be used to provide coolant or other fluid onto the workpiece 14 and/or tool 12 (here, "tool" and "reamer" are used interchangeably because the reamer 12 shown in the drawings is one example of a cutting tool that can be used). The fluid may cool the tool 12 and the workpiece 14, and it may remove debris and machined chips from the tool and workpiece. This may extend the life of the tool, and reduce or eliminate damage to the workpiece. The fluid may be provided in line with an opening or hole 15 in a workpiece 14 that is being machined, for example with a reamer 12. The outlet end 40 of the delivery tube 22 (and the bushing 50) may be arranged at a back side 100 (FIGS. 1 and 3) of a workpiece 14 that is opposite to the side 102 where the reamer 12 initially enters the workpiece 14. In this way, the fluid flow from the fluid delivery system 10 may be in a direction opposite to the direction of insertion of the tool 12 into the workpiece 14. At least with spiral fluted tools 12 (e.g. a reamer), the direction of fluid flow may be in the same general direction that chips are expelled from the tool as the workpiece is machined. This may facilitate removal of the chips and other debris and reduce the likelihood that the chips or debris may foul the workpiece 14 or tool 12 during the machining process. The fluid may also be provided through the bushing 50 which may help cool and keep clean the bushing to extend its life and prevent or reduce the likelihood that the bushing will be damaged in use.

In one implementation, as shown in FIG. 1 the fluid delivery system 10 is used during a reaming process for holes 15 in a steam turbine 14 (reference numeral 14 is used interchangeably for both "workpiece" and the illustrated turbine which is one example of a workpiece with which the fluid delivery system 10 can be used), which is also shown in FIG. 3. As shown, the turbine 14 includes a "bucket" or series of fins 104 to which turbine blades are mounted via pins extending through a series of holes 15 in the fins 104. There may be more than one bucket or series of fins 104 and the buckets may be coupled to and spaced along a center shaft 106. In this way, an axially and radially extending space 108 is provided between adjacent series of fins 104 and the shaft 106. When servicing a turbine 14, a series of coaxially aligned holes 15 in the fins 104 provide a passage through the fins through which a tool may be inserted. In this way, all of the coaxially aligned holes 15 in a series of fins 104 (e.g. one passage) may be reamed at the same time (or in stages with the same tool) to a different diameter to ensure a desired fit of a new pin in that series of aligned holes 15. To accurately ream each of the series of holes 15 to the same size and ensure they are properly aligned with each other, the reaming process must be done accurately.

One way to do this is to use a bushing 50 at the back side of the last fin 104, furthest from the fin 104 through which the tool 12 is initially inserted. The tool 12 may then be inserted through the holes 15 in the fins 104 and into the opening 62 of the bushing 50 to ensure proper alignment of the tool 12 with the fins 104. In some implementations, the tool 12 will a have an elongated pilot section 110 that is first aligned with and passed through the holes 15 in each of the fins 104, and then into the opening 62 of the bushing 50 before holes 15 in the fins are machined.

With the fluid delivery system 10 described herein, the bushing 50 may be carried by the flange fitting 48 and/or the delivery tube 22. In this way, when the bushing 50 is properly aligned with the workpiece 14, the delivery tube 22 is properly positioned to deliver fluid onto the workpiece 14 and tool 12. The position of the delivery tube 22 can be maintained by compressing the extender 84 onto the delivery tube 22 and placing the extender and delivery tube between adjacent series of fins 104 of the turbine 14, as shown in FIG. 1, or between a fin 104 and a rearward surface spaced from the fin (which may be a fixture, wall, or another portion of the turbine, as a few non-limiting examples). When the extender 84 is released, the spring 92 will extend the extender tube 86 (i.e. increase the effective length of the extender tube 86 and the delivery tube 22) until the cap 96 engages the rearward fin 104 or other surface. The force of the spring 92 will maintain the set position of the fluid delivery system 10 so that the delivery tube 22 and bushing 50 are properly aligned and their position maintained relative to the holes 15 in the fins 104.

Before the fin holes 15 are machined, the reamer 12 may be advanced until the pilot section 110 is received through all of a set of aligned holes 15 in the fins 104 and into the bushing 50. To ream the holes 15, the reamer 12 may be advanced further into the fins 104 which advances the pilot section 110 into the delivery tube 22. The shut-off valve 20 may be opened to permit fluid flow from the supply tube 18 into the delivery tube 22. Fluid flows out of the delivery tube 22, and through the flange fitting opening 54, the bushing opening 62 and around the pilot section 110 of the reamer 12. Under sufficient pressure, the fluid may be forced or sprayed along the reamer 12 and between the reamer 12 and the fins 104 through the holes 15. The reamer 12 may be advanced until the end of the reamer (i.e. the end of the pilot section 110) engages the adjustment member 78 within the delivery tube 22. Accordingly, the maximum insertion of the reamer 12 can be limited to prevent damage to the reamer 12 or workpiece 14, and the insertion limit can be adjusted by moving the adjustment member 78 relative to the delivery tube 22. After an aligned series of holes 15 are reamed, the fluid delivery system 10 can be moved into position for the next set of aligned holes 15 to be reamed. The bushing 50 can be aligned with the next set of holes 15, and the extender 84 can be released to quickly and easily position and maintain the desired position of the bushing 50 and delivery tube 22.

Figure 4:
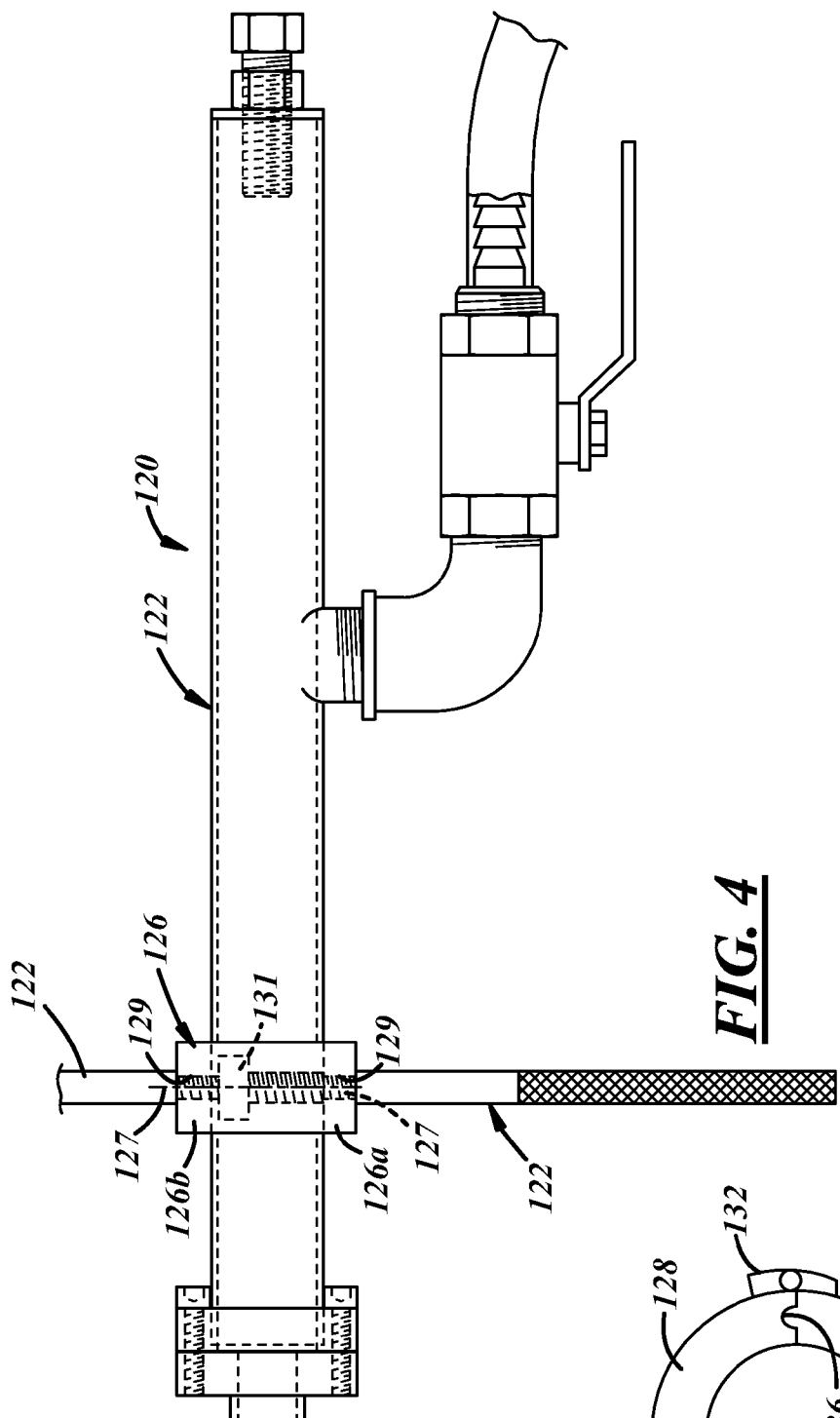
FIG. 4 is a side view of a fluid delivery system.
Figure 5:
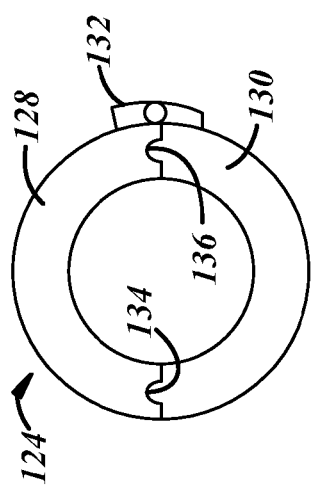
FIG. 5 is an end view of an alternate delivery tube.

FIGS. 4 and 5 illustrate another fluid delivery system 120 which may be constructed in substantially the same manner as the system 10 described above. Accordingly, similar components will not be described again. Instead, the following description will focus on a few of the differences in the system 120.

As shown in FIG. 4, the fluid delivery system 120 may include a handle 122 coupled to the delivery tube 124. To permit adjustment of the position of the handle 122, the handle 122 may be movably carried by or relative to the delivery tube 124, such as by a collar 126 slidably received along the delivery tube. The collar 126 may be temporarily held in position by a set screw or other releasable mechanism (perhaps a clamp, ball and detent system, or the like). The handle 122 could also be immovably attached to the delivery tube if adjustment is not desired. In the implementation shown, two opposed handles 122 are shown as being connected to the collar 126, such as by mating threads 127 formed on the handles 122 and in complementary sockets 129 in the collar 126.

As best shown in FIG. 5, the delivery tube 124 may be formed in two or more sections. In the implementation shown here, the delivery tube is formed from two sections 128, 130. The sections 128, 130 may be releasably coupled together to permit access to the interior of the tube to, for example, facilitate removal of a broken part of the tool 12 and facilitate cleaning of the tube interior, as desired, and recombined or reconnected for subsequent use of the delivery tube 124. In the implementation shown here, the tube 124 is split or divided along its linear length providing sections 128, 130 that are connected together at a hinge 132 providing a clamshell type tube that may be opened by pivoting the sections away from each other via the hinge 132. The seam between the sections may be straight, or it may include a recess 134 in one section and a projection 136 in the other to provide a mated connection for improved sealing/leak protection. A tube clamp could be used to maintain the sections 128, 130 tightly together, or the collar 126 may do so. By way of a non-limiting example, the collar could be formed in two pieces 126a, 126b releasably held together by a fastener 131, and in this manner, may hold or clamp the tube sections 128, 130 together.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A fluid delivery system for use with a cutting tool used to machine an opening in a workpiece, comprising:
   a delivery tube having an outlet to be aligned with a cutting tool;
   a fluid supply coupled to the delivery tube to provide fluid to the delivery tube under pressure, wherein the delivery tube is aligned with the workpiece at a side of the opening opposite to a side through which the cutting tool is initially inserted and supplies fluid to the workpiece and cutting tool in a direction generally opposite to the direction that the cutting tool is inserted into the workpiece; and
   an extender coupled to the delivery tube and movable to permit the delivery tube to be received and held in place between two surfaces.

2. The system of claim 1 wherein the extender includes a tube slidably coupled to the delivery tube and movable relative to the delivery tube to vary the combined length of the extender and the delivery tube.

3. A fluid delivery system for use with a cutting tool used to machine an opening in a workpiece, comprising:
   a delivery tube having an outlet to be aligned with a cutting tool;

a fluid supply coupled to the delivery tube to provide fluid to the delivery tube under pressure, wherein the delivery tube is aligned with the workpiece at a side of the opening opposite to a side through which the cutting tool is initially inserted and supplies fluid to the workpiece and cutting tool in a direction generally opposite to the direction that the cutting tool is inserted into the workpiece; and a bushing carried by the delivery tube and aligned with the outlet of the delivery tube, the bushing having an opening into which a pilot portion of the cutting tool extends before the cutting tool begins to machine the opening in the workpiece to position the outlet of the delivery tube to provide fluid through the opening in the bushing and onto the cutting tool and the workpiece, and the delivery tube to receive therein the at least part of the pilot portion as the cutting tool machines the workpiece.

4. The system of claim 3 which also comprises a flange fitting secured to the delivery tube and to which the bushing is mounted so that the bushing is carried by the delivery tube.

5. The system of claim 1 wherein the delivery tube is formed in more than one piece to provide access to the interior of the delivery tube.

6. The system of claim 5 wherein the delivery tube includes two sections each extending the linear length of the tube.

7. The system of claim 6 wherein the delivery tube sections may be separated to provide access to the interior of the delivery tube.

8. The system of claim 6 wherein the delivery tube sections are connected together by a hinge.

9. A fluid delivery system for use with a cutting tool used to machine an opening in a workpiece, comprising:

a delivery tube having an outlet to be aligned with a cutting tool;

a fluid supply coupled to the delivery tube to provide fluid to the delivery tube under pressure, wherein the delivery tube is aligned with the workpiece at a side of the opening opposite to a side through which the cutting tool is initially inserted and supplies fluid to the workpiece and cutting tool in a direction generally opposite to the direction that the cutting tool is inserted into the workpiece; and a handle coupled to the delivery tube.

10. The system of claim 9 wherein the delivery tube is formed in more than one piece and the handle is coupled to the delivery tube by a collar that holds the pieces of the delivery tube together.

11. The system of claim 9 wherein the handle is slidably movable along the delivery tube to permit adjustment of the handle position.

12. A fluid delivery system for use with a cutting tool used to machine an opening in a workpiece, comprising:

a delivery tube having an outlet to be aligned with a cutting tool;

a fluid supply coupled to the delivery tube to provide fluid to the delivery tube under pressure, wherein the delivery tube is aligned with the workpiece at a side of the opening opposite to a side through which the cutting tool is initially inserted and supplies fluid to the workpiece and cutting tool in a direction generally opposite to the direction that the cutting tool is inserted into the workpiece; and an adjustment member having a portion received within an interior of the delivery tube, and wherein the delivery tube is adapted to receive a portion of the cutting tool therein and the adjustment member provides a stop that limits insertion of the cutting tool into the delivery tube.

13. A fluid delivery system for use with a cutting tool used to machine an opening in a workpiece, comprising:

a delivery tube having an outlet to be aligned with a cutting tool;

an extender coupled to the delivery tube with an extender tube having a first end telescopically received over an end of the delivery tube, a biasing member that yieldably biases the extender away from the delivery tube so that the distance between a second end of the extender and the outlet of the delivery tube can be adjusted by slidably displacing the extender tube along the delivery tube; and a fluid supply coupled to the delivery tube to provide fluid to the delivery tube under pressure, wherein the delivery tube is aligned with the workpiece at a side of the opening opposite to a side through which the cutting tool is initially inserted and supplies fluid to the workpiece and cutting tool in a direction generally opposite to the direction that the cutting tool is inserted into the workpiece.

14. The system of claim 13 which also includes an adjustment member having a portion received within an interior of the delivery tube, and wherein the delivery tube is adapted to receive a portion of the cutting tool therein and the adjustment member provides a stop that limits insertion of the cutting tool into the delivery tube.

15. The system of claim 13 wherein the delivery tube includes two sections each extending the linear length of the delivery tube and wherein the tube sections may be separated to provide access to the interior of the delivery tube and recombined for subsequent use of the delivery tube.

* * * * *